(12) United States Patent
Mäkelä

(10) Patent No.: US 8,744,746 B2
(45) Date of Patent: Jun. 3, 2014

(54) DETERMINATION OF ROUTE FOR ARRANGING AUTOMATIC CONTROL OF MOBILE MINING MACHINE

(75) Inventor: Hannu Mäkelä, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 13/379,943

(22) PCT Filed: Jun. 22, 2010

(86) PCT No.: PCT/FI2010/050528
§ 371 (c)(1),
(2), (4) Date: Dec. 21, 2011

(87) PCT Pub. No.: WO2010/149851
PCT Pub. Date: Dec. 29, 2010

(65) Prior Publication Data
US 2012/0116666 A1    May 10, 2012

(30) Foreign Application Priority Data

Jun. 24, 2009    (FI) ........................................ 20095714

(51) Int. Cl.
*G01C 21/00*    (2006.01)
*G05F 1/00*    (2006.01)

(52) U.S. Cl.
USPC ........................................... 701/400; 701/23

(58) Field of Classification Search
CPC .............. G05D 1/0246; G05D 1/0212; G05D 2201/0216; G05D 2201/021; G01C 21/00; G01C 21/32; G01C 21/34
USPC ............... 701/400, 23, 24, 25, 410, 413, 425, 701/426, 430; 105/161
See application file for complete search history.

(56) References Cited

U.S. PATENT DOCUMENTS

| | | | | |
|---|---|---|---|---|
| 4,079,997 A | * | 3/1978 | Bienko et al. ................... | 299/1.2 |
| 4,790,402 A | * | 12/1988 | Field et al. ..................... | 180/169 |

(Continued)

FOREIGN PATENT DOCUMENTS

| | | |
|---|---|---|
| CN | 1117749 A | 2/1996 |
| CN | 1191594 A | 8/1998 |

(Continued)

OTHER PUBLICATIONS

Search Report based on Finnish Application No. 20095714 dated Apr. 22, 2010.

(Continued)

*Primary Examiner* — Fadey Jabr
*Assistant Examiner* — Angelina Shudy
(74) *Attorney, Agent, or Firm* — Morgan, Lewis & Bockius LLP

(57) ABSTRACT

The present method relates to a method of determining a route for automatically controlling a mobile mining machine. The route is determined computer-aidedly by executing, by a data processing machine configured for generating routes, the following steps of: retrieving an environment model comprising wall location data, receiving from a user at least an input for determining a starting point of the route and an input for determining an end point of the route, determining the route between the starting point and the end point on the basis of the environment model and data concerning properties of the mining machine, wherein the route is determined as route points at least for which position data are calculated, and storing the data determining the route to be used for automatically guiding the mining machine.

18 Claims, 4 Drawing Sheets

(56) References Cited

U.S. PATENT DOCUMENTS

| | | | |
|---|---|---|---|
| 4,817,000 A * | 3/1989 | Eberhardt | 701/25 |
| 4,846,297 A * | 7/1989 | Field et al. | 180/169 |
| 5,553,407 A | 9/1996 | Stump | |
| 5,615,116 A * | 3/1997 | Gudat et al. | 701/23 |
| 5,657,226 A * | 8/1997 | Shin et al. | 701/23 |
| 5,659,985 A | 8/1997 | Stump | |
| 5,671,554 A | 9/1997 | Geelhoed | |
| 5,704,142 A | 1/1998 | Stump | |
| 5,881,832 A * | 3/1999 | Zitz et al. | 180/169 |
| 5,911,775 A | 6/1999 | Tanimoto | |
| 5,922,041 A * | 7/1999 | Anderson | 701/468 |
| 5,956,250 A * | 9/1999 | Gudat et al. | 701/26 |
| 5,999,865 A * | 12/1999 | Bloomquist et al. | 701/25 |
| 6,016,616 A | 1/2000 | Geelhoed | |
| 6,058,344 A | 5/2000 | Rowe et al. | |
| 6,076,030 A | 6/2000 | Rowe | |
| 6,119,376 A | 9/2000 | Stump | |
| 6,128,574 A * | 10/2000 | Diekhans | 701/410 |
| 6,195,610 B1 | 2/2001 | Kaneko | |
| 6,195,922 B1 | 3/2001 | Stump | |
| 6,203,111 B1 * | 3/2001 | Ollis et al. | 299/1.05 |
| 6,292,725 B1 * | 9/2001 | Kageyama et al. | 701/23 |
| 6,363,632 B1 | 4/2002 | Stentz et al. | |
| 6,477,795 B1 | 11/2002 | Stump | |
| 6,636,807 B1 * | 10/2003 | Glasmacher et al. | 701/23 |
| 6,701,647 B2 | 3/2004 | Stump | |
| 6,898,503 B2 * | 5/2005 | Makela et al. | 701/50 |
| 8,234,059 B2 * | 7/2012 | Sugiyama et al. | 701/418 |
| 8,364,402 B2 * | 1/2013 | Ross et al. | 701/534 |
| 2001/0021888 A1 | 9/2001 | Burns et al. | |
| 2004/0128071 A1 * | 7/2004 | Schradi | 701/214 |
| 2004/0138799 A1 | 7/2004 | Makela et al. | |
| 2004/0158355 A1 | 8/2004 | Holmqvist et al. | |
| 2005/0085947 A1 * | 4/2005 | Aldred et al. | 700/253 |
| 2006/0069471 A1 | 3/2006 | Makela | |
| 2006/0069472 A1 * | 3/2006 | Makela | 701/23 |
| 2006/0265166 A1 | 11/2006 | Makel | |
| 2006/0271235 A1 | 11/2006 | Pulli et al. | |
| 2007/0027612 A1 | 2/2007 | Barfoot et al. | |
| 2007/0192024 A1 * | 8/2007 | Flann et al. | 701/207 |
| 2008/0027599 A1 * | 1/2008 | Logan et al. | 701/23 |
| 2008/0208415 A1 | 8/2008 | Vik | |
| 2008/0215390 A1 | 9/2008 | Gipps et al. | |
| 2009/0043439 A1 | 2/2009 | Barfoot et al. | |
| 2010/0076640 A1 * | 3/2010 | Maekawa et al. | 701/26 |
| 2011/0301800 A1 * | 12/2011 | Furuno et al. | 701/25 |
| 2011/0320085 A1 * | 12/2011 | Gharsalli et al. | 701/26 |
| 2012/0035798 A1 * | 2/2012 | Barfoot et al. | 701/25 |
| 2012/0095639 A1 * | 4/2012 | Makela et al. | 701/25 |
| 2012/0095640 A1 | 4/2012 | Lehtinen et al. | |
| 2012/0123678 A1 * | 5/2012 | Poppen et al. | 701/468 |
| 2012/0158280 A1 * | 6/2012 | Ravenscroft | 701/400 |
| 2012/0179322 A1 * | 7/2012 | Hennessy et al. | 701/25 |
| 2012/0191290 A1 * | 7/2012 | Bourque et al. | 701/29.1 |
| 2013/0006514 A1 * | 1/2013 | Martin et al. | 701/400 |
| 2013/0173109 A1 * | 7/2013 | Hukkeri et al. | 701/23 |

FOREIGN PATENT DOCUMENTS

| | | |
|---|---|---|
| FI | 20095714 | 12/2010 |
| JP | 60-37339 | 2/1985 |
| JP | 62-214406 | 9/1987 |
| JP | 2003-295952 | 10/2003 |
| WO | 2004/085965 | 10/2004 |
| WO | 2004/085966 | 10/2004 |
| WO | WO 2004/086084 | 10/2004 |
| WO | 2007/012198 | 2/2007 |
| WO | 2007/012199 | 2/2007 |
| WO | 2008/036805 | 3/2008 |
| WO | WO 2008/060689 | 5/2008 |
| WO | 2008/078002 | 7/2008 |
| WO | WO 2008117712 A1 * | 10/2008 |
| WO | 2010/149857 | 12/2010 |
| WO | WO 2010/149851 | 12/2010 |

OTHER PUBLICATIONS

International Search Report for PCT/FI2010/050528 dated Oct. 11, 2010.

Supplementary European Search Report for European Application No. 10 79 1677, dated Jan. 16, 2013.

E. Bierden et al.; "*The Application of Satellite Communications to the Data Link Requirement for Unmanned Ground Vehicles*," Robotics and Knowledge Based Systems Workshop, Department of National Defence and the Canadian Space Agency, Jan. 1, 1995, pp. 1-6.

K. Murphy et al.; "*GPS Aided Retrotraverse for Unmanned Ground Vehicles*," SPIE Proceedings, The International Society for Optical Engineering, vol. 2738, Apr. 1, 1996, pp. 133-142.

J. Roberts et al.; "*Reactive navigation and opportunistic localization for autonomous underground mining vehicles*," Information Sciences 145 (2002), pp. 127-146.

A. Vardy; "*Long-Range Visual Homing*," Proceedings of the 2006 IEEE International Conference on Robotics and Biomimetics, Kunming, China, Dec. 17-20, 2006, pp. 220-226.

\* cited by examiner

DETERMINATION OF ROUTE FOR ARRANGING AUTOMATIC CONTROL OF MOBILE MINING MACHINE

RELATED APPLICATIONS

The present application is a U.S. National Phase Application of International Application No. PCT/FI2010/050528 (filed 22 Jun. 2010) which claims priority to Finnish Application No. 20095714 (filed 24 Jun. 2009).

FIELD OF THE INVENTION

The invention relates to arranging automatic control of mobile mining machines, and particularly to teaching a route of a mining machine in order to arrange automatic control of the mining machine.

BACKGROUND OF THE INVENTION

Various mobile mining machines, such as rock drilling rigs, loading and transport equipment, are used in a mine. The mining machines may be manned or unmanned. The unmanned mining machines may be remote-controlled from a control room, for instance, and they may be provided with measuring devices suitable for location determination. The unmanned mining machines may be controlled to follow a desired route in a mine, provided that the location of the machine can be determined. The location of a machine may be determined by using laser scanners, for instance.

WO 2007/012198 discloses a method of guiding a mining vehicle automatically. By driving the mining vehicle manually or through teleoperation, an operator teaches the mining vehicle a route to follow with no operator intervention involved. U.S. Pat. No. 5,615,116 also discloses a method of automatically navigating vehicles, wherein a route used by a navigation system may have been taught through driving the vehicle or the route may have been determined manually.

After a route has been taught, the route may be edited and tested. Typically, it is this phase of teaching, editing and testing the route that is the slowest and most laborious one while introducing a new production area. A further problem almost invariably is that the teaching and testing of routes coincide with various mounting and foundation work to be carried out in the production area simultaneously, leaving very little time for testing.

BRIEF DESCRIPTION OF THE INVENTION

An improved solution is now provided for determining routes for mobile mining machines. The solution is characterized by what is disclosed in the independent claims.

According to an aspect of the invention, a route for the mining machine is determined computer-aidedly by executing, by a data processing machine configured for generating routes, the following steps of: retrieving an environment model comprising wall location data, receiving from a user at least an input for determining a starting point of the route and an input for determining an end point of the route, determining the route between the starting point and the end point on the basis of the environment model and data concerning properties of the mining machine as route points at least for which position data are calculated, and storing the data determining the route to be used for automatically guiding the mining machine.

Some preferred embodiments of the invention are disclosed in the dependent claims.

The present invention provides several advantages. Since routes no longer have to be taught through driving a mining machine, it is possible to shorten the time necessarily taken by a route to be taught, and thus the time during which the production area has to be closed to other activity.

BRIEF DESCRIPTION OF THE FIGURES

Some embodiments of the invention are now described in closer detail in connection with some preferred embodiments and with reference to the accompanying drawings, in which.

DETAILED DESCRIPTION OF AN EMBODIMENT OF THE INVENTION

Figure 1:
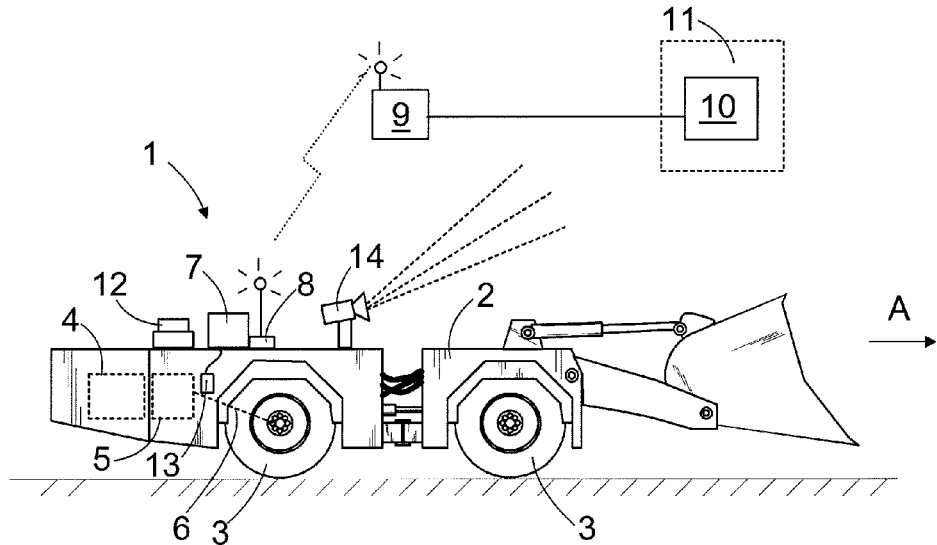
FIG. 1 is a schematic side view showing a mobile mining machine.

FIG. 1 shows a mobile mining machine 1, in this case loading equipment whose front end is provided with a bucket for transporting and loading excavated material. Alternatively, the mining machine 1 may be a rock drilling rig or transport equipment with a dump box, for instance.

The mining machine 1 comprises a movable carrier 2 provided with several wheels 3 of which at least one is a drive wheel driven by a motor 4 via transmission. The motor 4 may be an electric motor, combustion engine, hydraulic motor or any other device for generating a rotation torque. The transmission usually includes a gearbox 5 and cardan axles 6, differential gear, and other power transmission members for transmitting the rotation torque from the motor 4 to the drive wheels. The mining machine 1 is further provided with a control system which includes at least a first control unit 7 configured to control actuators in the mining machine 1 for controlling and driving the machine.

The mining machine 1 may further be provided with a data transfer unit 8 which enables the first control unit 7 to establish a data transfer connection with a second control unit 10 external to the mining machine 1 by utilizing a wireless connection provided by a base station 9. The second control unit 10 may reside in a control room 11, which may be arranged outside the mine. The control unit 7, 10 may be a computer equipped with appropriate software, or an entity consisting of a plurality of computers.

It is to be noted that a mining machine may generally refer to various machines that are used for rock excavation operation in surface or underground production areas and that may also be used in locations other than actual mines. FIG. 1 is a simplified view, and the control system of the mining machine 1 typically comprises several units for executing different control functions. The control system of the mining machine 1 may be decentralized, e.g. an entity consisting of modules connected to a Controller Area Network (CAN) bus and responsible for all measurements and controls of the machine. The information system of the control room 11 may also comprise one or more servers, databases, operator workstations, and a further connection to other networks and systems.

The control system of the mining machine 1 comprises a positioning system or unit. According to an embodiment, the positioning system comprises at least one gyroscope 12 which enables a direction of the machine to be determined accurately for positioning. The positioning system further comprises means for determining a distance travelled by the machine 1. According to an embodiment, a distance is measured by an arrangement wherein one or more sensors 13 are used for measuring the rotation of a wheel 3. On the basis of the measurement data, the positioning system determines the rotational movement of the wheel and then calculates the magnitude of distance travelled by the machine. The positioning system may further comprise one or more scanners 14, e.g. a laser scanner or a corresponding device, for scanning the space surrounding the mining machine 1 and the geometry of that space.

Figure 2:
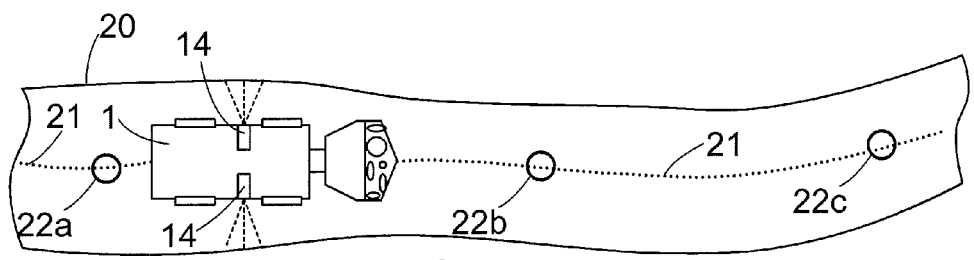
FIG. 2 is a top view illustrating an arrangement for positioning and guiding the mining machine according to an embodiment.

According to an embodiment, FIG. 2 shows a principle of use of a route based on scanning and to be used in positioning. One or both sides of the mining machine 1 may be provided with laser scanners 14 which enable the profile and surface contours of a mine tunnel 20 to be determined. When a desired route 21 has been taught and stored in the memory of the control system, the mining machine 1 may be guided to follow the route 21 autonomously. A location of the mobile mining machine 1 may be determined during automatic control e.g. by using laser scanners 14. The laser scanners scan the wall profiles of the tunnel in order to determine the location on the basis of a pre-stored environment model, which means that any separate tags, such as reflectors or radio frequency tags, become redundant on the walls of the tunnel.

It is known that the route 21 of the mining machine 1 may be provided by teaching, in which case the mining machine 1 is driven by manual control along the desired route while the control system simultaneously stores route points 22*a*, 22*b*, 22*c* of the route 21 in the memory at determined intervals. However, a computer-based route determination solution is now provided which enables routes to be generated on the basis of a predetermined environment model and data concerning properties of a mining machine with no need to drive the mining machine along a route in order to teach the route.

An environment model generally refers to a model modelling a production area, which may have been determined e.g. by driving the mining machine around within the production area and by scanning wall profiles. A production area generally refers to an area wherein a mobile mining machine is used. The environment model comprises at least data concerning the location of the walls of a tunnel. The environment model may determine x and y coordinates of the points describing the location of the walls in a particular standard system of coordinates. When generation of an environment model based on scanning is used, the x and y coordinates determine the location of a wall at a height at which the scanner 14 resides in the mining machine 1. In the case of one plane, a two-dimensional tunnel map is provided by outputting the points of the environment model on an xy plane. The environment model may also comprise other information. Should a three-dimensional scanning be used, the environment model could further comprise z coordinate information, in which case a 3D profile of the tunnels would be available.

Figure 3:
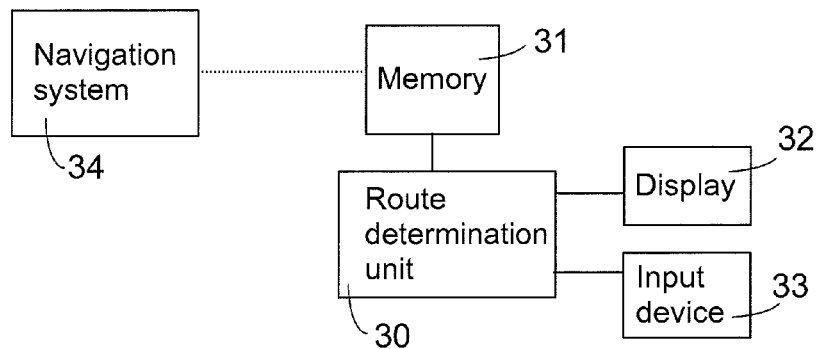
FIG. 3 illustrates an apparatus according to an embodiment for determining routes for a mining machine.

FIG. 3 illustrates an apparatus according to an embodiment for determining routes for a mining machine. The apparatus comprises at least a unit 30 for determining routes, and particularly for generating routes computer-aidedly by utilizing an environment model. The route determination unit 30 executes at least one route determination algorithm which, for a new route, determines route points and route-point-specific control data on the basis of the environment model and data of the properties of the mining machine. The route determination algorithm may be designed such that route point data of a new route may be determined without position data provided by the navigation system of the mining machine 1 for determining an ordinary route.

The unit 30 may be implemented e.g. by a general-purpose processor of a data processing device, on which one or more computer programs executing route determination procedures are run. The computer program comprises code for executing at least some of the features related to route determination already described and to be illustrated in the following in connection with FIGS. 4 to 7. The computer program may be stored on a computer-readable storage medium, such as a memory 31 or a separate memory medium, wherefrom the computer program may be retrieved to be run by the processor.

The route determination unit 30 is connected to the memory 31 in which various data used for route determination, such as an environment model, data of the properties of the mining machine, and other data and settings affecting route determination, may be stored. Alternatively, these data may be obtained from an external device over a data transmission network. The route determination unit 30 comprises an access interface for a display 32, and at least one access interface for at least one input device 33, such as a keyboard and/or mouse. The apparatus may also have one or more other interfaces to other systems. The apparatus typically comprises at least one data transfer unit which may utilize e.g. standard Transport Control Protocol/Internet Protocol (TCP/IP) based network protocols.

The route determination unit 30 may be implemented e.g. on an operator workstation. However, the route determination unit 30 does not have to be implemented in the data processing apparatus used for controlling the mining operation, or necessarily even connectable thereto, so successful route determination is not bound to any particular place or apparatus. It is to be noted, however, that it is possible to implement at least some of the present technical features related to route determination, e.g. at least some functions of the route determination unit 30, in the mobile mining machine 1 and the data processing apparatus thereof. The apparatus implementing at least the route determination unit 30 may as such be provided by different appropriately configured data processing devices. A software application implementing the route determination unit 30 may be stored e.g. in a portable computer from which route data may be transferred to the control unit 10 in the control room e.g. via a data transfer connection provided by the data transfer unit included in the apparatus or by using a memory medium.

FIG. 3 further illustrates a connection to a navigation system 34, which typically is a unit external to the route determination apparatus. The navigation system may be provided with route data which are stored in the memory 31 or in another memory and on the basis of which the navigation system may control the mining machine 1 when the route is being used. The navigation system 34 may be implemented or controlled e.g. by the control unit 10 external to the mining machine 1. The system may be provided with a specific drive task management system, e.g. an application to be executed at the control unit 10 located in the control room 11. The drive task management system determines drive tasks on the basis of inputs received from the operator. The drive task management system may retrieve pre-stored route data from the memory 31 and forward route data and/or control commands to the control unit 7 of the mobile mining machine 1. In order for the mobile mining machine 1 to follow the desired route, the machine is controlled e.g. on the basis of route data received by the control unit 7 and real-time position data produced by the positioning system. It is also possible that at least some of the route data are pre-stored in the memory of the mining machine 1 and that the identifiers of the segments or route points of only the desired route are transmitted from the remote control unit 10.

Figure 4:
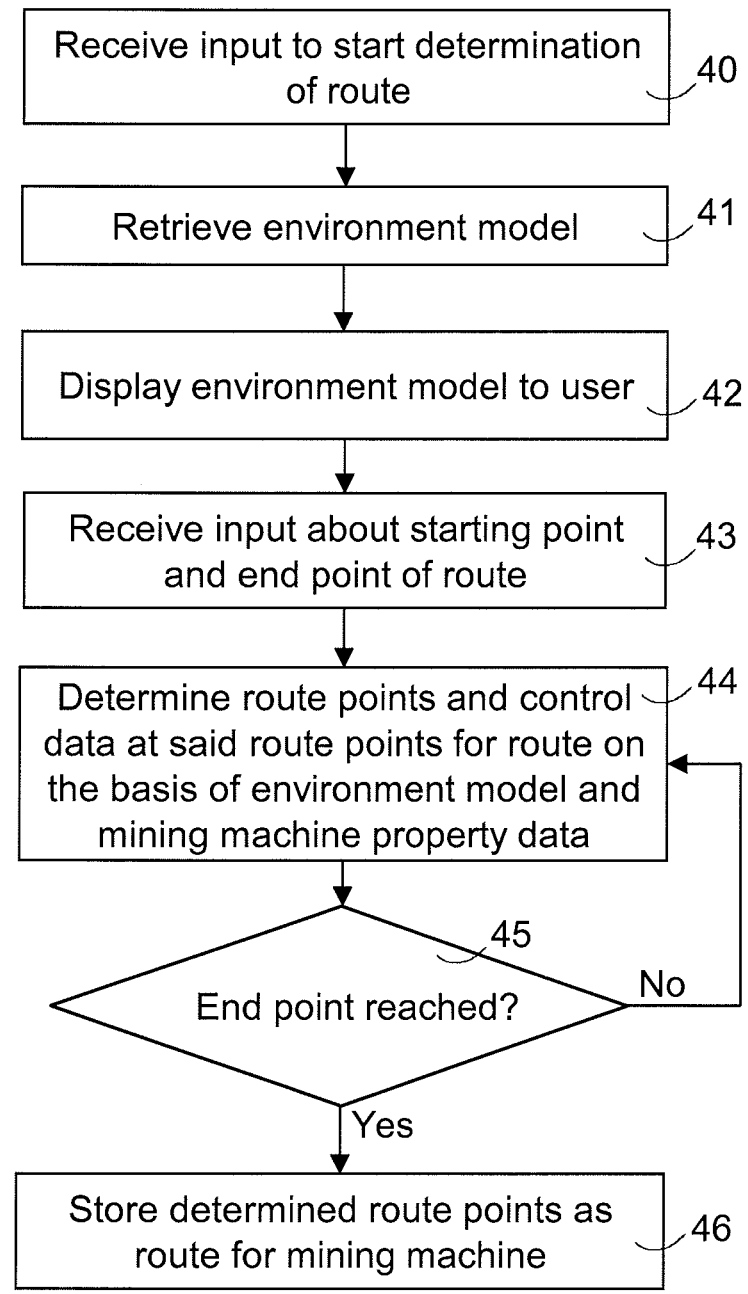
FIGS. 4 to 6 illustrate methods according to some embodiments.

FIG. 4 shows a method according to an embodiment for determining routes computer-aidedly by means of an environment model so as to enable teaching of a route by driving to be avoided. The method may be implemented at the route determination unit 30 illustrated in FIG. 3.

In step 40, an input is received from a user determining a route, e.g. an operator or a designer, in order to start the determination of the route for a mobile mining machine. The user e.g. starts a route determination application or tool and selects a new route determination by the user interface. In step 41, a pre-taught and pre-stored environment model wherein the user wishes to determine the route is retrieved from the memory 31 or from elsewhere in the system.

In step 42, the retrieved environment model is displayed to the user on a map template. The user indicates 43 at least a starting point and an end point of the route. The route determination unit 30 may receive the basic route specifications from the user via the interface of the input device 33. On the basis of the basic route specifications, environment model, and data of the properties of the mining machine to use the route, route-point-specific data are determined 44 so as to later enable the mining machine 1 to be automatically guided to follow the route. For each route point along the route, control data are determined to be used when the mining machine resides at the particular route point. These control data comprise at least position data for the mining machine, but they may also include other control data, such as speed data.

The mining machine property data may have been retrieved from the memory 31 e.g. in response to the user's input received in connection with step 41. Data concerning the machine, e.g. the type of the machine on the basis of which property data are retrieved, may also be received from the user. At least one route generation algorithm executed by the route determination unit 30 uses the points of the retrieved environment model at least for ensuring that the calculated routes are such that on the basis of its property data, the mining machine 1 cannot hit a wall in any part of the route. A more detailed embodiment for determining route point data is illustrated below in connection with FIG. 5.

In step 45, it is checked if the end point of the route has been reached. If not, in step 44 the method continues with the determination of the new route point. After all route points have been determined, in step 45, a data file comprising the route point data of the route may be stored e.g. in the memory 31. According to an embodiment, the route point data are stored in a structural Extensible Markup Language (XML) based data file but, of course, the application of the invention is not restricted to the use of any particular file format.

It is to be noted that FIG. 4 only shows a generalized example of route determination, and that the determination of route points and storage of data may be implemented in a manner different from that shown in FIG. 4. An application determining a route may also be arranged to execute additional steps, e.g. to optimize at least a part of a route after the route points have been determined preliminarily, and thus to update the route point data.

According to an embodiment, in connection with step 44, an optimal route is calculated between the starting and end points and, completely automatically, suitable route points located between the starting and end points are determined for the route. Alternatively, the user indicates 43 a suitable number of intermediate points. In addition to the route points indicated by the user, the route determination unit 30 may also be configured to add route points to intersection areas, for instance.

The mining machine property data may comprise data of the external dimensions of the mining machine. In step 44 it is then possible to calculate the position of each route point on the basis of the external dimensions data and the environment model such that at a route point, a predetermined minimum distance is provided between the mining machine and the tunnel walls.

According to an embodiment, either entered by the user or given as a default, a specification is associated with the points given by the user, on the basis of which the route being generated proceeds via accurately given points, or the points are only suggestive. In such a case, a route point is determined for the route to accurately or closely correspond with the position of the route point inputted by the user. As to the suggestive route point, for instance, a route point may be determined to reside within a predetermined distance from the position received from the user, which makes it possible to computationally determine an optimal position for the route point as far as the forward motion of the mining machine is concerned.

It is also possible to computationally generate a continuation route from a previous generated route section onwards such that at a route intersection point the route is as smooth as possible. When a known teaching method based on driving is used, these route intersection points often have to be edited manually. A production area environment model is quite quick to teach. After the environment model has been taught for the production area, all relevant data have been collected for determining routes with no separate driving in the tunnels. When the determination is carried out sufficiently well, with the possible exception of the most difficult and crammed places, no actual teaching is necessary.

Figure 5:
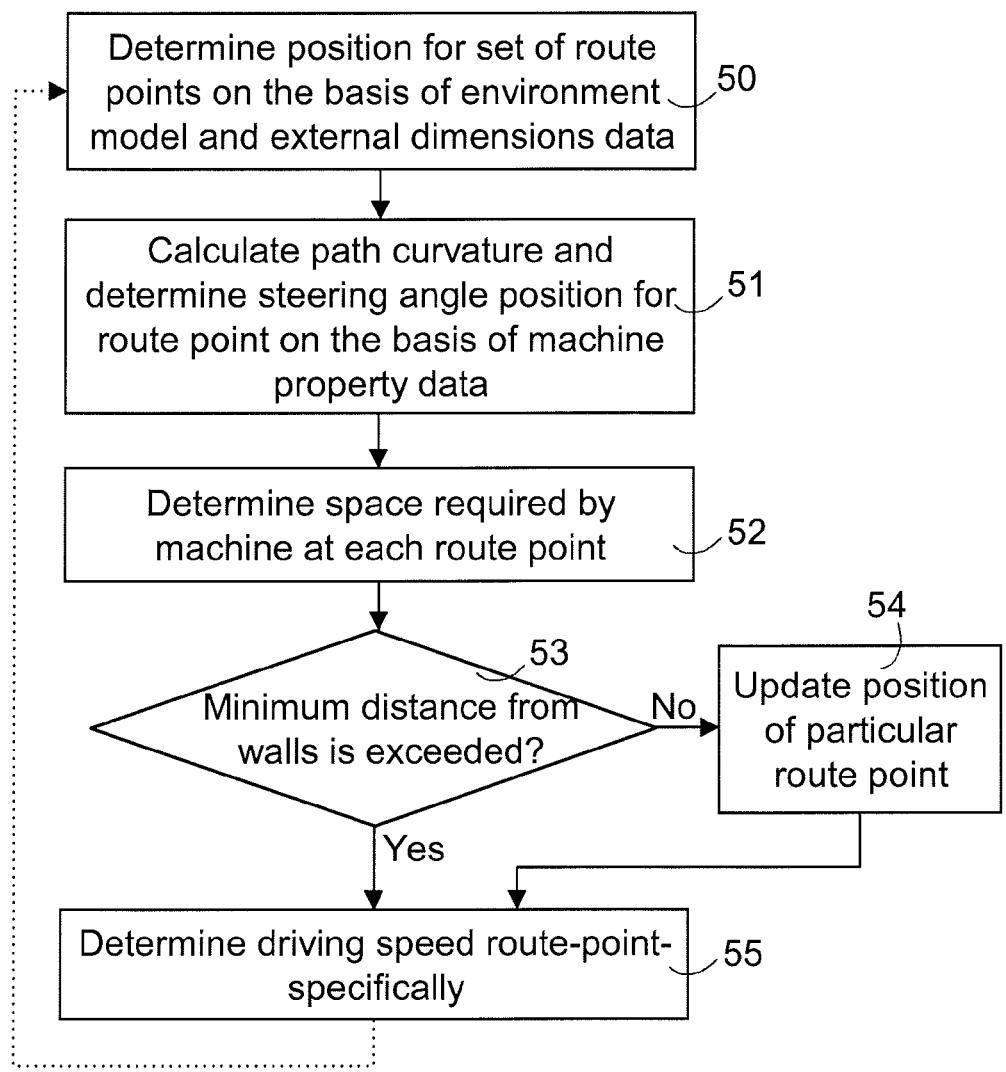

FIG. 5 illustrates in a more detailed manner the determination of route points of a route, applicable e.g. in step 44 of FIG. 4 and in the route determination unit 30.

FIG. 5 illustrates how a set of route points and related route-point-specific data are determined. A set of route points may consist e.g. of a predetermined number of successive route points, but the number of route points to be processed at one time may also vary. On the basis of the environment model and the data of the external dimensions of the machine, a position is determined for each route point at particular standard coordinates. More particularly, x and y coordinates may be calculated for a route point on the basis of the environment model such that the route point is located at a predetermined distance from a previous route point. The route point may be determined to reside substantially on the central line between walls. The route determination algorithm may be configured to determine, from the points of the environment model, the direction of a tunnel in the surroundings of each route point being determined by finding, from among the set of points, the neighbours of the particular route point and by calculating the direction of the wall on the basis thereof. The direction of the wall, again, determines the direction of the tunnel. When the direction of the wall on both sides of the tunnel is known, the route determination algorithm may calculate the central line of the tunnel and, at the beginning of route calculation, place the route points at the centre of the tunnel.

After the positions of the route points have been determined, on the basis of the position data of the route points, it is possible to calculate 51 a path curvature and, on the basis of the path curvature, a position of a steering angle at each route point. The machine property data are used for this purpose.

The route determination unit 30 determines, for each route point, an appropriate steering angle position that makes the machine follow the given route.

On the basis of data concerning the external dimensions and/or kinematics of the machine, the route determination unit 30 calculates 52 the amount of space the mining machine needs around it with the steering angle position necessary at a particular route point, or these data may have been pre-stored. In addition to the external dimensions of the mining machine, data of the position of axles of a mining machine and/or a steering joint of an articulated steered mining machine may be used.

After the space required by the mining machine has been determined, for each route point it may be checked 53 on the basis of the environment model, the determined required space, and the position data of the route point in question whether or not the machine resides at a predetermined distance from both walls. If the minimum distance is exceeded, the route points in question may be selected to be part of the route. If the predetermined distance is not exceeded for one or more route points, the position of the one or more route points in question is updated 54 such that the minimum distance is exceeded. If this is not possible, an attempt may be made to change the path curvature of the route in order to decrease the space required by the machine. It is to be noted that the route determination algorithm may be configured to update the positions of the route points also for other reasons in order to optimize the route, e.g. in order to minimize the path curvature.

In step 55, a highest allowable speed is determined for each route point, either generally or possibly vehicle-specifically. Data of the determined route points may be stored e.g. after step 55 either permanently or temporarily. If a need exists to further determine route points for the route e.g. on the basis of the checking carried out in step 45 of FIG. 4, the process returns to step 50 to determine a new set of route points. The position data of the already determined route points may be appropriately utilized for determining new route points e.g. in order to determine a path curvature.

It is to be noted that FIG. 5 is simplified and suggestive, and the order of the steps, for instance, may differ from that shown in FIG. 5, or steps 50 and 51 are not separate ones, as shown in the figure. In step 50, for instance, it would be possible to determine a location area within which a route point may reside, and in step 51 a location as optimal as possible is selected for the mining machine.

According to an embodiment, a speed reference and gear data are calculated for each route point of the route, which together form a speed profile to be followed on the route. When calculating the profile, the width of the tunnel and the meandering of the route are taken into account. It may be automatically ensured that the route-specific gear reference value is such that revolutions of the motor in the particular gear will suffice. This ensures that the hydraulic control of the machine is provided with a sufficient amount of oil in order to enable a sufficiently fast turning. It is also taken into account in the speed profile calculation that the speed drops appropriately in anticipation of curves or crammed sections.

According to an embodiment, in connection with step 51 the route determination unit 30 calculates the amount of space the machine needs around it for different positions of a steering angle available at a particular route point. The route determination application may thus determine, on the basis of the environment model, the steering angle positions available at the route point. In step 51, a position from among the available positions of the steering angle may be selected that requires as few steering movements as possible to the next route point. In this embodiment, the position of the steering angle may thus be included in the route-point-specific control data, and the control system 1 of the mining machine, while the route is driven, directly steers the machine according to the received steering angle position data.

The route determination unit 30 may be configured to calculate a route such that a machine on the route always keeps a given minimum distance from both walls, provided that the maximum path curvature of the route does not exceed a given limit and, on the other hand, that a rate of change of the path curvature is minimized. In such a case, the driving speed of the machine may be adapted 55 to be as high as possible. Information necessary for calculating the control data is included in the environment model and the dimensional parameters of the machine. A more detailed method is disclosed in WO2004/085966; the description of route points and generation thereof illustrated in connection with FIGS. 3 to 5 in the publication is incorporated herein by reference.

In addition to the data illustrated in FIG. 5, various other mining- machine-specific or mining-machine-type-specific control data may be determined. Such control data include e.g. an appropriate gear, the position of a boom or a lifting arm possibly provided in a mining machine, and the position of a possible bucket. These data are, of course, dependent on the selection of equipment the particular mining machine carries, so not every mining machine is provided with such data. Control data may be determined to relate to one or more route points or, in some cases, the entire route.

It is to be noted that as distinct from FIG. 5, also less complicated route point data may be generated wherein no speed and/or steering angle data are determined but only the position coordinates of a route point in a definite system of coordinates. In this embodiment, the control apparatus of the mining machine 1 calculates driving directions and turning angles on the basis of the coordinates of successive route points such that the route of the mining machine follows the route determined by the points at the same time as the steering angles of the vehicle are calculated to suitably reside between the points by calculating according to the curvature of the determined curved route. Then, similarly, turning at intersections may also be calculated by means of the software included in the control apparatus of the mining machine by utilizing the position data of the route points exclusively.

According to an embodiment, the routes are determined as interconnected route sections, i.e. segments, each being provided with an identifier code of its own. For each segment, in turn, when desired, it is possible to determine limit values for driving speeds and other functions, determined according to the properties of a particular segment. These specifications may be determined even mining-machine-specifically, taking the properties of each mining machine into account. The route determination unit 30 may be arranged as illustrated above to determine segment-specific data, i.e. at its simplest, data of the route points in each segment and the identifier code of the segment. In the embodiment illustrated in FIG. 5, for instance, it is possible to determine the route points of one segment at a time. The segment-specific data may be stored in advance in the memory of the control apparatus of the mining machine 1, in which case route determination takes place simply by only transmitting a list of the identifier codes of the segments of the route related to a particular task. Such segment-based route determination is described in more detail in WO2004/085965, which is incorporated herein by reference.

According to an embodiment, a route is provided with a bucket emptying sequence determined therein on the basis of a pre-stored bucket emptying model. According to an embodiment, in the computational route generation illustrated above, a bucket emptying sequence is also determined on the basis of a predetermined bucket emptying model, which also enables the emptying of a bucket to be determined as part of the route quickly and without driving the mining machine.

A bucket emptying model may have been determined on the basis of the data concerning a previously taught route in a general-purpose form such that control data related to the emptying of a bucket are not bound to any particular position. The bucket emptying model may determine path points, each being provided with a determined bucket position value, boom position value, and a distance from a reference point, e.g. the first or last point of a path being determined. Such determination and utilization of an emptying model for determining a route are described yet in more detail in the Applicant's other FI patent application No. 20095712, whose section describing the determination and use of emptying models is incorporated herein by reference. In the determination of the route points illustrated above in connection with FIGS. 4 and 5, it is possible to determine route point data for a bucket emptying area on the basis of the data of a bucket emptying model selected by the user. The bucket and boom position data obtained from the bucket emptying model selected by the user may be associated e.g. in step 44 with one or more route points of the bucket emptying area. When necessary, new route points may also be added on the basis of distance data of the emptying model in order to determine a bucket emptying sequence in the route with a sufficient accuracy determined by the emptying model. This embodiment enables an approved bucket emptying sequence to be utilized for determining a route, and no need exists to teach even the bucket emptying to the route through driving the mining machine.

Figure 6:
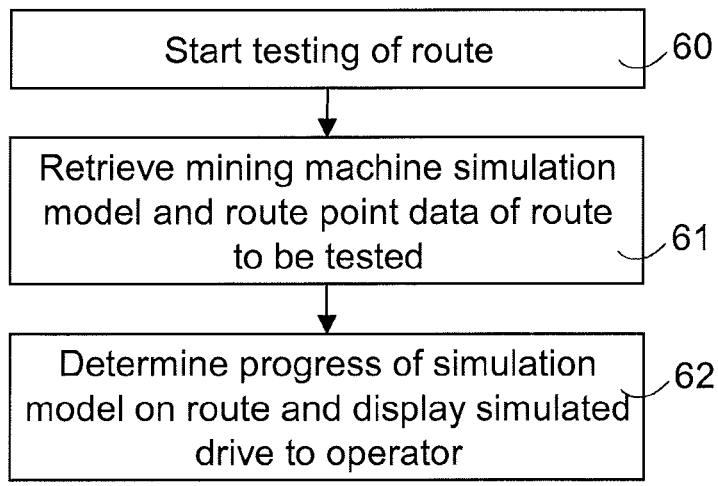

According to an embodiment, a route generated in the above-described manner may be tested in a computer-based manner by utilizing simulation, which is illustrated in FIG. 6. In response to a need to test in the manner being presently illustrated a route determined at least partly without driving, a computer program executing a testing application retrieves or determines in step 61 a mining machine simulation model and the data of the route to be tested, i.e. the data concerning the route points of the route. The testing application may be executed by the route determination unit 30, e.g. as a part of a route determination tool. The testing application drives 62 a computer model modelling a mining machine on the route being tested. The movement of the mining machine may be illustrated to the user on a mine map generated on the basis of the environment model or in a model of another type modelling the production area. The user can be shown the amount of space left around the machine in each part of the route. Alternatively, the program calculates the space on the route left between the machine and the wall and informs the user of possible points at which a minimum distance is not exceeded. This embodiment enables the time necessary for testing a route to be shortened or the testing of a route by driving the mining machine 1 to be even avoided completely.

Figure 7:
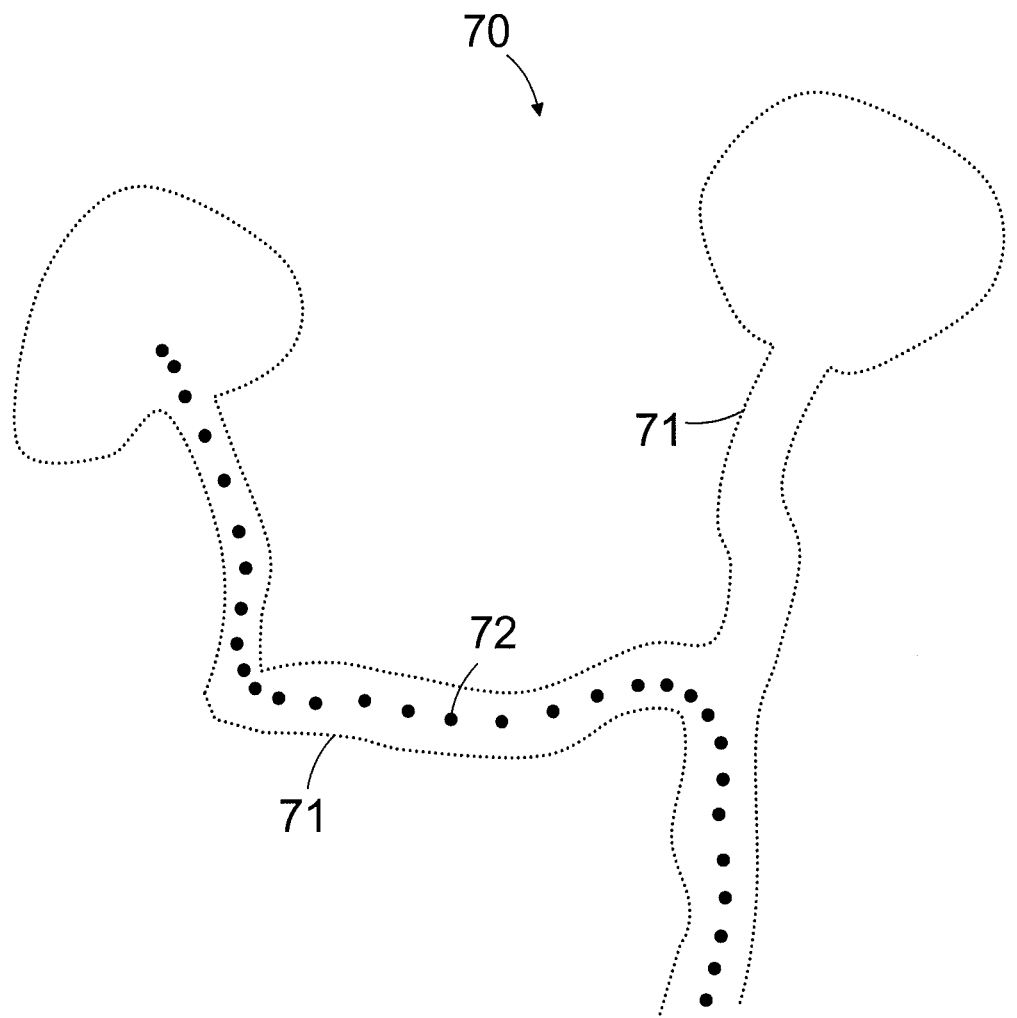
FIG. 7 illustrates a route determined for a production area.

FIG. 7 further illustrates a simplified model 70 modelling a part of a production area, e.g. an environment model shown in a two-dimensional form and describing at least the locations of walls 71 illustrated in a broken line. The model is also provided with route points 72 of a route. A view like the one illustrated in FIG. 7 may e.g. be shown to the user after the above-illustrated route determination implemented without driving. As illustrated in FIG. 7, at intersections the route points may be determined more densely, for instance.

By utilizing the above-illustrated features, the route point data of the computationally determined route may also be used for determining other routes. According to an embodiment, for a computationally determined one-way route, a return route is also determined computationally by using the route point data of the route, in which case it is possible to determine an entire to-and-fro drive task with no need to drive the mining machine 1 along the route. In this embodiment, by the route determination unit 30, the return route may be provided with a determined route identifier of its own, and the route determination unit 30 also determines at least some of the route points of the route as the route points of the return route in a reverse order. The data of the route points of the return route may be determined on the basis of route point data copied from the route data by determining as position data of the route points of the return route the position data of the route points of the route in an order reverse with respect to the route points of the route and by deleting additional control data associated with one or more route points of the route, such as bucket position data. At one or more route points, the return route may be provided with possibly necessary additional control data determined therefor, such as bucket position data. When necessary, new route points may also be added to the return route.

It is apparent to a person skilled in the art that as technology advances, the basic idea of the invention may be implemented in many different ways. The invention and its embodiments are thus not restricted to the above-described examples but may vary within the scope of the claims. Various features may thus be omitted, modified, or replaced by equivalents, and the features set forth in the present application may be combined in order to provide various combinations.

The invention claimed is:

1. A method of determining a route for automatically controlling a mobile mining machine, the method comprising, for the purpose of performing a task, determining a route the mining machine is to follow, wherein the method further comprises determining the route for the mining machine computer-aidedly by executing, by a data processing machine configured for generating routes, the following steps of:

retrieving an environment model comprising wall location data, receiving from a user at least an input for determining a starting point of the route and an input for determining an end point of the route, determining the route between the starting point and the end point on the basis of the environment model and data concerning properties of the mining machine by executing at least one route determination algorithm to determine route points for which at least position data are calculated, and storing the data determining the route to be used for automatically guiding the mining machine, determining position data for a set of route points of the route on the basis of the environment model, calculating a path curvature on the basis of the determined position data, determining, on the basis of the calculated path curvature and route-point-specifically, a certain position of a steering angle by which the mining machine follows the route, determining a space required by the mining machine at said position of the steering angle on the basis of the mining machine property data, checking if a predetermined minimum distance from tunnel walls is exceeded on the basis of the determined space required by the mining machine, route point position data, and the tunnel wall location data determined by the environment model, and updating the position of the route point in response to the predetermined minimum distance not being exceeded.

2. A method as claimed in claim 1, comprising determining control data for each route point along the route to be used when the mining machine resides at the particular route point, the control data comprising at least position data and speed data.

3. A method as claimed in claim 1, comprising retrieving a model modelling the mining machine and said data determining the route, and testing the computer-aidedly generated route by simulating the driving of the mining machine on the route.

4. A method as claimed in claim 1, comprising receiving from the user an input concerning the position of at least one route point that is to be followed accurately or that is suggestive, and determining a route point on the route to accurately or closely correspond with the position of the route point inputted by the user.

5. A method as claimed in claim 1, comprising receiving from the user an input concerning the position of at least one route point that is to be followed accurately or that is suggestive, and determining a route point on the route to accurately or closely correspond with the position of the route point inputted by the user.

6. A method as claimed in claim 2, comprising retrieving a model modelling the mining machine and said data determining the route, and testing the computer-aidedly generated route by simulating the driving of the mining machine on the route.

7. A method as claimed in claim 2, comprising receiving from the user an input concerning the position of at least one route point that is to be followed accurately or that is suggestive, and determining a route point on the route to accurately or closely correspond with the position of the route point inputted by the user.

8. A method as claimed in claim 3, comprising receiving from the user an input concerning the position of at least one route point that is to be followed accurately or that is suggestive, and determining a route point on the route to accurately or closely correspond with the position of the route point inputted by the user.

9. A method as claimed in claim 6, comprising receiving from the user an input concerning the position of at least one route point that is to be followed accurately or that is suggestive, and determining a route point on the route to accurately or closely correspond with the position of the route point inputted by the user.

10. An apparatus comprising a data processing device for determining route data for automatically controlling a mobile mining machine, and an interface for receiving inputs from a user of the apparatus, wherein the apparatus is configured to determine a route computer-aidedly, the apparatus being configured to:

retrieve an environment model comprising wall location data, receive from the user at least an input for determining a starting point of the route and an input for determining an end point of the route, determine the route between the starting point and the end point on the basis of the environment model and data concerning properties of the mining machine by executing at least one route determination algorithm to determine route points for which at least position data are calculated, and store the data determining the route to be used for automatically guiding the mining machine, wherein the apparatus is configured to:

determine position data for a set of route points of the route on the basis of the environment model, calculate a path curvature on the basis of the determined position data, determine, on the basis of the calculated path curvature and route-point-specifically, a certain position of a steering angle by which the mining machine follows the route, determine a space required by the mining machine at said position of the steering angle on the basis of the mining machine property data, check if a predetermined minimum distance from walls of the tunnel is exceeded on the basis of the determined space required by the mining machine, route point position data, and tunnel wall location data determined by the environment model, and update the position of the route point in response to the predetermined minimum distance not being exceeded.

11. An apparatus as claimed in claim 10, wherein the apparatus is configured to determine control data for each route point of the route to be used when the mining machine resides at the particular route point, the control data comprising at least position data and speed data.

12. An apparatus as claimed in claim 10, wherein the apparatus is configured to retrieve a model modelling the mining machine and said data determining the route, and the apparatus is configured to test the computer-aidedly generated route by simulating the driving of the mining machine on the route.

13. An apparatus as claimed in claim 10, wherein the apparatus is configured to receive from the user an input concerning the position of at least one route point that is to be followed accurately or that is suggestive, and determine a route point on the route to accurately or closely correspond with the position of the route point inputted by the user.

14. An apparatus as claimed in claim 11, wherein the apparatus is configured to retrieve a model modelling the mining machine and said data determining the route, and the apparatus is configured to test the computer-aidedly generated route by simulating the driving of the mining machine on the route.

15. An apparatus as claimed in claim 11, wherein the apparatus is configured to receive from the user an input concerning the position of at least one route point that is to be followed accurately or that is suggestive, and to determine a route point on the route to accurately or closely correspond with the position of the route point inputted by the user.

16. An apparatus as claimed in claim 12, wherein the apparatus is configured to receive from the user an input concerning the position of at least one route point that is to be followed accurately or that is suggestive, and to determine a route point on the route to accurately or closely correspond with the position of the route point inputted by the user.

17. An apparatus as claimed in claim 14, wherein the apparatus is configured to receive from the user an input concerning the position of at least one route point that is to be followed accurately or that is suggestive, and to determine a route point on the route to accurately or closely correspond with the position of the route point inputted by the user.

18. A non-transitory computer-readable medium comprising:

a computer program for controlling a processing unit, wherein the computer program comprises instructions for execution by the processing unit that determine a route for a mining machine, and wherein the instructions comprise the following steps:

retrieving an environment model comprising wall location data, receiving from a user at least an input for determining a starting point of the route and an input for determining an end point of the route, determining the route between the starting point and the end point on the basis of the environment model and data concerning properties of the mining machine by executing at least one route determination algorithm to determine route points for which at least position data are calculated, and storing the data determining the route to be used for automatically guiding the mining machine, determining position data for a set of route points of the route on the basis of the environment model, calculating a path curvature on the basis of the determined position data, determining, on the basis of the calculated path curvature and route-point-specifically, a certain position of a steering angle by which the mining machine follows the route, determining a space required by the mining machine at said position of the steering angle on the basis of the mining machine property data, checking if a predetermined minimum distance from tunnel walls is exceeded on the basis of the determined space required by the mining machine, route point position data, and the tunnel wall location data determined by the environment model, and updating the position of the route point in response to the predetermined minimum distance not being exceeded.

\* \* \* \* \*